Sept. 24, 1963   J. P. SHELL   3,104,555
PIVOTAL POWER STEERING PUMP SUPPORT
Filed Feb. 9, 1960   2 Sheets-Sheet 1
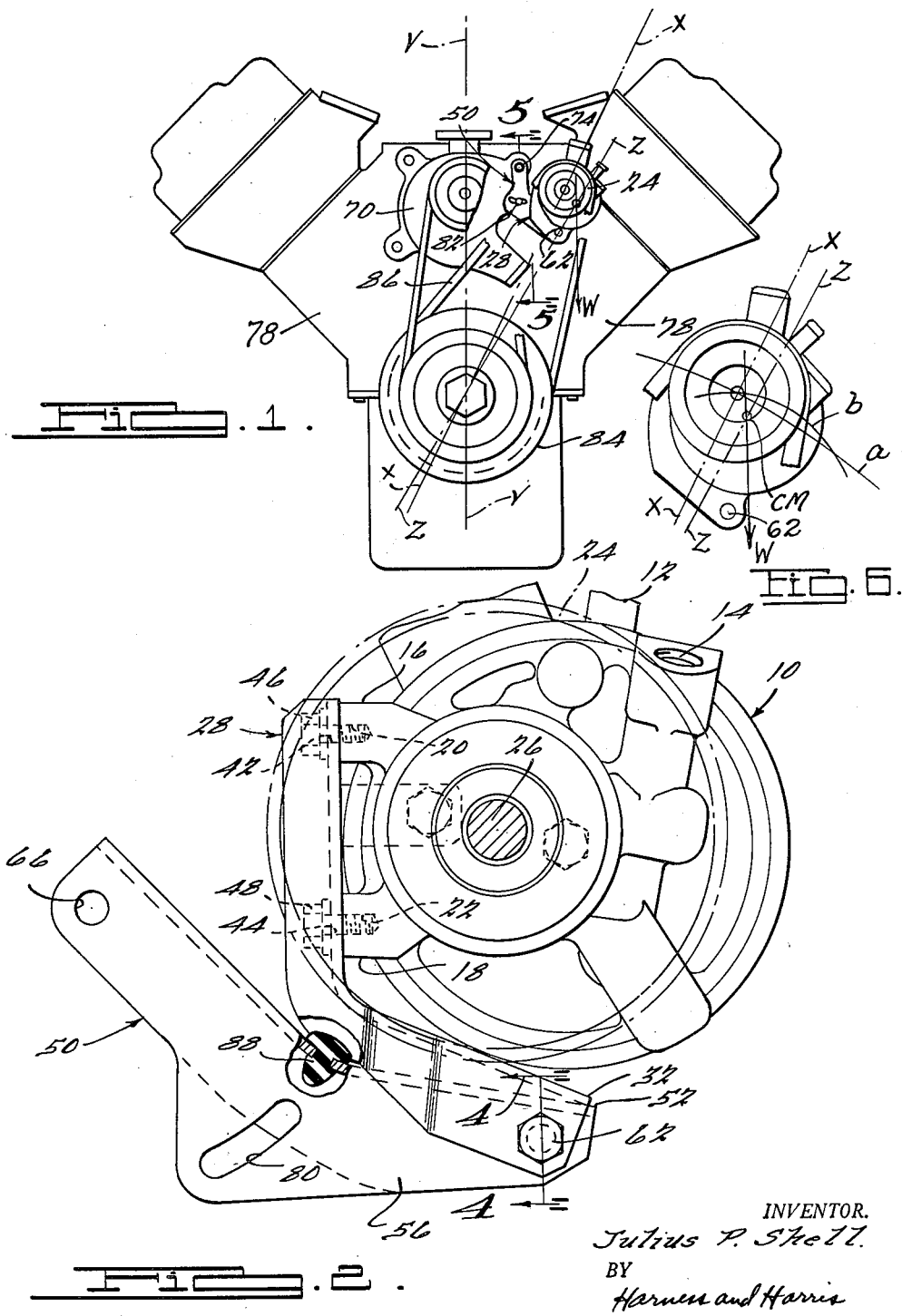
INVENTOR.
Julius P. Shell.
BY
Harness and Harris
ATTORNEYS.

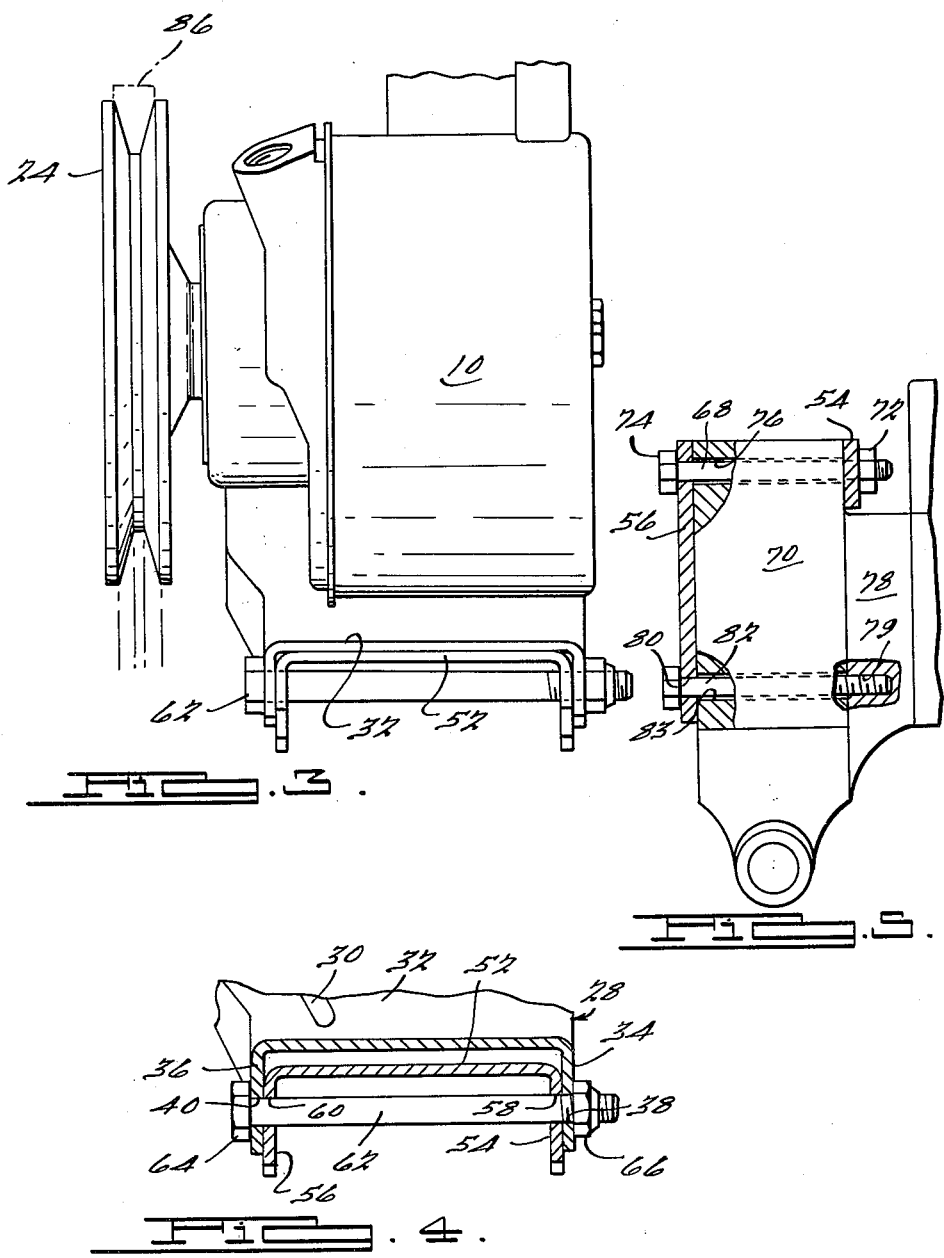

United States Patent Office 3,104,555
Patented Sept. 24, 1963

3,104,555
PIVOTAL POWER STEERING PUMP SUPPORT
Julius P. Shell, Detroit, Mich., assignor to Chrysler Corporation, Highland Park, Mich., a corporation of Delaware
Filed Feb. 9, 1960, Ser. No. 12,890
2 Claims. (Cl. 74—242.9)

This invention relates to a power steering pump or other pressure developing devices, and particularly concerns a pivotal mounting structure therefor which is adapted to utilize the pressure developed within the pump or device to cause the flexible belt driving the same to become tensioned progressively in response to increasing pressure developed in the pump or device.

The conventional mounts for the power steering pumps used in vehicles today do not take advantage of the tendency of the pressure developed by the pumps to rotate the pumps in the direction of motion of their impellers in order to tighten the pump drive belt to prevent slippage thereof. Many anti-slipping devices have been devised to maintain the belt taut in order to prevent slipping thereof under the high pump pressures of the modern power steering units (up to 1200 p.s.i.) but these devices do not tighten the belt as a function of power steering pressure, and very frequently these devices maintain the belt in such a taut or highly tensional condition that accelerated wear thereof is eminent.

It is a principal object of the present invention to provide a power steering pump mounting which will cause the drive belt to become taut or more highly tensioned as a function of the increase in pressure developed within the pump with increase in pump load.

Another object is to provide a pivotal mounting for a pressure developing device which will tension the drive belt thereof according to pressure developed within said device.

The above objects are accomplished in the present invention by the provision of a bracket 50 which is secured to the front of the vehicle engine or any other suitable place on the vehicle engine or on the vehicle body, and a pump support means 28 which is pivotally mounted on the bracket means 50 and secured to the pump 10 and so positioned that the pressure developed within the pump 10 will cause the support 28 to rotate on the bracket 50 and increase the distance between the engine drive pulley 84 and the driven pulley 24 of the pump so as to increase the tension on the belt as a function of pump pressure.

A further object is to provide an extremely simple inexpensive and effective pivotal mounting structure for a pressure developing device, which structure is adapted to cause rotation of the device in response to pressure developed therein.

Further objects and advantages of the present invention will become apparent from the following description and drawings in which:

FIGURE 1 is a front view of a vehicle engine embodying the present invention;

FIGURE 2 is an enlarged front view of the power steering pump and supporting mechanism of FIGURE 1;

FIGURE 3 is a side view of the pump and supporting structure;

FIGURE 4 is a cross-sectional view of the bracket and support of FIGURE 2 taken along the line 4—4 thereof in the direction of the arrows;

FIGURE 5 is a side view of the pump and supporting means as mounted on the engine taken along the line 5—5 of FIGURE 1 in the direction of the arrows; and FIG. 6 is an enlarged diagrammatic view of the structure shown in FIG. 1.

Referring to the drawings, a power steering pump generally designated 10 and having an inlet 12 and outlet 14 is provided with attaching legs 16 and 18 provided with threaded bolt holes 20 and 22, respectively. A driven pulley 24 is provided on the impeller shaft 26 of the pump and suitably keyed thereto for causing rotation of the pump impeller (not shown) as the pulley 24 is rotated. The normal pumping direction of the pulley is clockwise.

The pump supporting structure of the present invention comprises support means 28 having a V-shaped upper surface and a channel cross section as shown in FIGURES 2 and 4, respectively. Suitable ridges 30 may be formed in the upper surface or web portion 32 of the support to strengthen the same. Legs 34 and 36 extend downwardly from web 32 and are provided with apertures 38 and 40 respectively providing second pivot means. This support means 28 may be formed by a stamping operation. Suitable apertures 42 and 44 are provided in the web 32 at the upper portion of the bracket and slidably receive bolts 46 and 48 respectively which are threaded into apertures 20 and 22 in the pump housing to secure the support means thereto.

A bracket 50 also having a slight V-shape and a channel cross-section is provided with a web 52, and legs 54 and 56 having apertures 58 and 60 respectively providing first pivot means. Apertures 38, 40, 58, and 60 of the support and bracket respectively slidably receive a stud 62 which is held in position by head 64 and nut 66 to provide a pivotal axis for support 28 on bracket 50.

Each of the legs 54 and 56 of bracket 50 are provided at their upper ends with aligned apertures 66 through which a bolt 68 may be slidably inserted to pivotally mount bracket 50 at its upper end to a water pump housing 70 as shown in FIGURE 5. Stud 68 is secured in place by nut 72 and head 74 and is slidably received in aperture 76 in the water pump housing. Housing 70 is secured to the engine block 78 in the conventional manner. A lower portion of leg 56 of bracket 50 is provided with an arcuate slot 80 which receives a bolt 82 as shown in FIGURE 5 which is slidable in aperture 83 and threaded into the block 78 at 79. Bolt 82 is slidable in slot 80 and adapted to be tightened into the block 78 to permanently position bracket 50 once it is adjusted. The forward portions of webs 32 and 52, as shown in FIGURE 2, are adapted to abut each other and prevent any further rotation of the pump in a clockwise direction around its pivot.

As shown in FIGURE 1, the belt axis designated X—X representing the line connecting the centers of the engine drive pulley 84 and pump pulley 24 is at an angle with respect to the vertical axis V of the vehicle and the pivot axis 62 of the pump is positioned to the right of the belt axis X—X. This arrangement allows the pressure developed in the pump to rotate the pump clockwise around its pivot 62 and tighten the drive belt 86 as a function of the internal pressure of the pump as it acts on the pump housing.

A rubber stop 88 may be secured to bracket 50 to prevent metal to metal contact of the bracket and support means 28 whenever the pump pressure is suddenly reduced.

FIG. 6 is an enlarged diagrammatic view of the pump mounting shown in FIG. 1. Lines V—V, X—X and Z—Z show the relationship of the pivot axes such that the weight or mass W of the pump 10 acts to develop an initial belt tension with the pump torque load acting to supplement the initial belt load as torque load is applied to the pump. Arcs $a$ and $b$ bring out that the belt 86 will be tightened as torque reaction or loading of pump 10 causes the pump to swing clockwise about its pivot 62.

In operation, referring to FIGURES 1 and 2 of the drawings, the driving belt 86 transmits a clockwise torque to pump pulley 24 and shaft 26 of the hydraulic pump 10. The resistance against rotation of said shaft 26 by the back pressure developed in the pump fluid outlet 14 will be transmitted to the pump 10 as a force which will tend to rotate the pivotally mounted pump unit in a clockwise direction. As the pump 10 rotates clockwise about the pivot pin 62 its pulley 24 will move upwardly and away from the engine crankshaft pulley 84 and the belt 86 will be tightened on the pulleys 24 and 84. The degree of tightening will be proportional to the load applied to the pump impeller shaft 26. The engagement of the bracket webs 32, 52, as shown in FIG. 2, prevents the clockwise rotation of the pump 10 to such a degree that it would over tighten the drive belt 86. Stop means 88 limits movement of the pump in a counterclockwise direction.

I claim:

1. In a motor vehicle having an engine driven pulley, a pulley driven power steering pump, a flexible drive belt drivingly connecting the engine driven pulley and the pump pulley, said power driven pump being pivotally mounted on the vehicle and arranged such that the steering pump output pressure varies between a minimum light load value at straight ahead steering position and a maximum load value of several times said minimum value during full turn steering positions, the pivotal mounting for said steering pump comprising a substantially V-shaped steering pump supporting bracket means having one leg thereof carried by, depending from and mounted on said vehicle in a substantially vertical position, the other leg of said bracket means having a horizontally extending steering pump pivot journal means eccentrically arranged beneath the mounting of said bracket one leg on the vehicle with the steering pump pivotally mounted on the pump pivot journal means on the other leg of said steering pump bracket means to provide for pivotal movement of the steering pump about a journal axis parallel to the steering pump pulley axis due to the gravitational movement of the eccentrically positioned steering pump mass about its underlying pivotal journal so as to constantly tension said drive belt with a force proportional to the steering pump mass, said steering pump journal means and said supporting bracket means cooperating with the steering pump pressure load to automatically provide for additional pivotal movement of said steering pump in an arcuate direction tending to move said steering pump pulley away from said engine driven pulley in response to an increase in fluid pressure in said steering pump output due to increased steering pump load to thereby further increase the tension on said drive belt with increase in steering pump load, the centers of said engine driven and steering pump pulleys defining a straight line that is angularly offset from a straight line extending between the engine driven pulley and the steering pump journal, said steering pump supporting bracket means having portions engageable with the steering pump to limit the amount of belt tensioning pivotal movement of the steering pump in either direction.

2. A belt tensioner device for a motor vehicle having an engine driven pulley, a pulley driven power steering pump, a flexible drive belt drivingly connecting the engine driven pulley and the pump pulley, said power steering pump being adapted to be pivotally mounted on the vehicle wherein the steering pump output pressure varies between a minimum light load value at straight ahead steering position and a maximum load value during full turn steering positions, the pivotal mounting for said steering pump comprising an elongated, substantially V-shaped, steering pump supporting bracket means adapted to have one leg thereof arranged in a substantially vertical position and mounted on said vehicle, the other leg of the bracket means having a horizontally extending steering pump journal means eccentrically arranged beneath the mounting for the bracket means on the vehicle to provide for pivotal mounting of the steering pump about an axis parallel to the steering pump pulley axis due to the gravitational movement of the steering pump mass about its underlying eccentrically positioned journal so as to constantly tension the drive belt with a force proportional to the steering pump mass, the steering pump journal means and said pump supporting bracket means cooperating with the steering pump pressure load to automatically provide for additional pivotal movement of said steering pump in an arcuate direction about its journal to move said steering pump pulley away from said engine driven pulley in response to the combination of both the gravity action of said eccentrically arranged, pivotally mounted steering pump and the steering pump torque reaction due to an increase in pressure in said steering pump output as a result of increased steering pump load to thereby further increase the tension on said drive belt, the centers of said engine driven pulley and said pump pulley defining a straight line that extends between the angle defined by a vertical line through the engine driven pulley and a line extending between the steering pump journal and the engine driven pulley.

References Cited in the file of this patent

UNITED STATES PATENTS

| | | |
|---|---|---|
| 1,196,927 | Brush | Sept. 5, 1916 |
| 1,242,166 | Fitzgerald | Oct. 9, 1917 |
| 1,254,320 | Fitzgerald | Jan. 22, 1918 |
| 2,037,436 | Roddewig et al. | Apr. 14, 1936 |
| 2,075,297 | O'Brien | Mar. 30, 1937 |
| 2,517,328 | Lownsberg | Aug. 1, 1950 |
| 2,791,126 | Christopher | May 7, 1957 |

FOREIGN PATENTS

| | | |
|---|---|---|
| 114,906 | Australia | Apr. 2, 1942 |
| 666,984 | Great Britain | Feb. 20, 1952 |